(12) United States Patent
Farley et al.

(10) Patent No.: US 6,787,574 B1
(45) Date of Patent: Sep. 7, 2004

(54) EMULSIFICATION OF ALKENYL SUCCINIC ANHYDRIDE SIZE

(75) Inventors: Charles E. Farley, Conyers, GA (US); George Anderson, Stockbridge, GA (US); Karla D. Favors, Atlanta, GA (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 175 days.

(21) Appl. No.: 09/694,789

(22) Filed: Oct. 24, 2000

(51) Int. Cl.[7] .................... B01F 17/22; B01F 17/18
(52) U.S. Cl. .................... 516/15; 162/67; 162/42; 162/198; 162/201; 524/47; 525/54; 525/31
(58) Field of Search .................... 524/47; 525/54.31; 162/158, 164.1, 164.6, 168.3, 168.1, 175; 516/15, 67, 102, 198, 201

(56) References Cited

U.S. PATENT DOCUMENTS

| | | |
|---|---|---|
| 3,785,921 A | 1/1974 | Ide et al. |
| 4,040,900 A | 8/1977 | Mazzarella et al. |
| 4,131,576 A | 12/1978 | Iovine et al. |
| 4,322,472 A | 3/1982 | Kaspar et al. |
| 4,400,496 A | 8/1983 | Butler et al. |
| 4,545,855 A | 10/1985 | Sweeney |
| 4,545,856 A | 10/1985 | Sweeney |
| 4,575,528 A | 3/1986 | Van Eenam |
| 4,604,163 A | 8/1986 | Van Eenam |
| 4,606,773 A | 8/1986 | Novak |
| 4,657,946 A | 4/1987 | Rende et al. |
| 4,684,708 A | 8/1987 | Deets et al. |
| 4,721,655 A | 1/1988 | Trzasko et al. |
| 4,744,864 A | 5/1988 | Deets et al. |
| 4,810,301 A | 3/1989 | Yoshioka et al. |
| 4,849,055 A | 7/1989 | Yoshioka et al. |
| 4,855,343 A | 8/1989 | Degen et al. |
| 4,872,951 A | 10/1989 | Maliczyszyn et al. |
| 4,882,087 A | 11/1989 | Yoshioka et al. |
| 4,964,915 A | 10/1990 | Blixt et al. |
| 5,075,401 A | 12/1991 | Zhang |
| 5,104,486 A | 4/1992 | Sweeney |
| 5,176,748 A | 1/1993 | Nikoloff et al. |
| 5,243,008 A | 9/1993 | Ahmed et al. |
| 5,281,673 A | 1/1994 | Ahmed et al. |
| 5,334,685 A | 8/1994 | Ahmed et al. |
| 5,399,660 A | 3/1995 | Uchida et al. |
| 5,472,485 A | 12/1995 | Pandian et al. |
| 5,595,631 A | 1/1997 | Tsai et al. |
| 5,627,224 A | 5/1997 | Lyrmalm et al. |
| 5,658,378 A | 8/1997 | Tsai et al. |
| 5,759,249 A | 6/1998 | Wasser |
| 5,824,190 A | 10/1998 | Guerro et al. |
| 5,962,555 A | 10/1999 | Glover |
| 5,969,011 A | 10/1999 | Frölich et al. |
| 5,990,216 A | 11/1999 | Cai et al. |

OTHER PUBLICATIONS

Japan Patent Office Computer Translation of JP–09–111692 A.*

* cited by examiner

Primary Examiner—José A. Fortuna

(57) ABSTRACT

Alkenyl succinic anhydride (ASA) size emulsions are prepared using a grafted cationic acrylamide starch co-polymer as an emulsification agent. The ASA size emulsions of the present invention exhibit significantly greater stability compared to presently available ASA size emulsions. The grafted starch co-polymer also is a more efficient emulsification agent for ASA size, permitting the use of less emulsification agent, thereby saving cost.

9 Claims, No Drawings

EMULSIFICATION OF ALKENYL SUCCINIC ANHYDRIDE SIZE

FIELD OF THE INVENTION

The present invention is directed to a process of emulsifying alkenyl succinic anhydride (ASA) size and to an ASA size emulsion. Description of Related Art Alkenyl succinic anhydrides (ASA) are useful in the sizing of cellulosic materials. As described in U.S. Pat. No. 4,606,773 to Novak, ASA sizes generally are represented by the formula

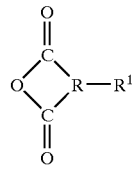

wherein R represents a dimethylene or trimethylene radical and $R^1$ is a hydrophobic group which may be selected from alkyl, alkenyl, aralkyl, and aralkenyl. Because ASA sizes of this structure are not water soluble, it generally is necessary to emulsify the ASA size to provide a composition which permits adequate contact with cellulosic fibers. ASA size emulsions typically are made with anionic or cationic starches, cationic polymers such as diallyldimethyl ammonium chloride polymers, polyamides, etc., or blends of starches and synthetic cationic polymers.

One major drawback associated with presently available ASA size emulsions is their relative instability. Separation or breakage normally occurs within as little as 4-6 hours after the emulsion is made. The precipitate undesirably can form deposits on pumps and in piping and other equipment.

U.S. Pat. No. 4,606,773 to Novak describes emulsifying ASA size using a physical blend of a cationic co-polymer, such as acrylamide-dimethylaminoethylacrylate, acrylamide-diethylaminoethyl acrylate, acrylamide-dimethylaminoethylmethacrylate, or acrylamide-diallyldimethyl animonium chloride, and a cationic starch made from corn starch or potato starch. The blend is said to provide increased stability to the emulsion over the use of either the co-polymer or the starch alone.

It would be desirable to develop a method of emulsifying ASA size that provides an emulsion having increased stability compared to presently available emulsions. It also would be desirable to develop a more cost-effective method of emulsifying ASA size.

SUMMARY OF THE INVENTION

It has been found that alkenyl succinic anhydride (ASA) size emulsions made using a starch grafted cationic acrylanide co-polymer as an emulsification agent exhibit greater stability compared to presently available ASA size emulsions. An ASA size emulsion prepared in accordance with a preferred embodiment of the invention exhibits more than 24 hours of stability, even up to 7 days or more of stability. It also has been found that the starch grafted co-polymer is a more efficient emulsification agent for ASA size. As a result, less emulsification agent is needed to emulsify ASA size, thereby saving cost.

In accordance with one aspect of the invention, a process of emulsifying an alkenyl succinic anhydride (ASA) size comprises blending an alkenyl succinic anhydride and a starch grafted cationic acrylamide co-polymer under conditions sufficient to form an emulsion. The ASA size optionally contains a surfactant such as sodium dioctyl sulfosuccinate.

The emulsified ASA size made in accordance with the present invention can be used in the manufacture of paper, paperboard, and the like in accordance with methods well known to those skilled in the art.

DETAILED DESCRIPTION OF THE INVENTION

The present invention comprises an emulsion formed from three main components, (1) water forming a continuous aqueous phase, (2) the ASA occupying the discontinuous phase, and (3) the emulsification agent, which in the practice of the present invention comprises a starch grafted cationic acrylamide co-polymer. The emulsion of this invention can be used in the same applications which have previously used ASA size emulsions.

A wide variety of ASA size can be used in the practice of the present invention and the invention is not to be limited in the nature of the ASA size. The ASA size most often contains from about 14 to about 22 carbon atoms, more usually from about 16 to about 18 carbon atoms. Blends of ASA materials also are useful. Such ASA sizes are commercially available and/or can be readily prepared by those skilled in the art. Examples of ASA size are described in U.S. Pat. Nos. 3,102,064, 4,040,900, 3,968,005, and U.S. Pat. No. 3,821,069, the disclosures of which are incorporated by reference herein. A preferred ASA size is NOVASIZE ASA®, available from Georgia-Pacific Paper Chemicals, which essentially is a blend of $C_{16}$–$C_{18}$ ASA with a minor portion (~0.1 wt %) of $C_{14}$ ASA.

The ASA size preferably is mixed with a surfactant prior to forming the emulsion. The use of a surfactant significantly reduces energy requirements for preparing the emulsion. The surfactant should be oil-soluble or ASA-soluble and can be non-ionic, anionic, or cationic. Preferably, the surfactant is anionic. Given these criteria, the selection of a suitable surfactant for a particular ASA size will be apparent to those skilled in the art with the aid of no more than routine experimentation. A preferred surfactant is sodium dioctyl sulfosuccinate. The surfactant typically is added in an amount of about 0.1 to about 5 parts, more typically from about 0.5 to about 1.5 parts, per 100 parts by weight of the ASA size.

The emulsification agent comprises a starch grafted cationic acrylamide co-polymer. The starch grafted co-polymer can be prepared by the graft polymerization of an acrylamide monomer onto a starch substrate or backbone. Various free radical polymerization methods can be used for grafting acrylamide monomers to starch, e.g., radiation activated free radical polymerization, redox based free radical polymerization and mechanical fission. One method for carrying out graft polymerization involves preparing an aqueous solution of the starch and acrylamide monomers, adding thereto a water-soluble free radical catalyst, and then carrying out the polymerization at a suitable reaction temperature. Typical free radical catalysts which may be used include hydrogen peroxide, solution soluble organic peroxides and hydroperoxides, persulfates, and ceric ion. An activator, which is typically a mild reducing agent, can also be added along with the catalyst. One known activator is sodium formaldehyde sulfoxalate.

Starches which can be used include various plant carbohydrates, such as corn starch, rice starch, potato starch, and the like, or derivatives thereof. Example of starch derivatives, often called modified starches, include oxidized starches, hydroxyalkylated starches, carboxyalkylated starches, various solubilized starches, enzyme-modified starches, etc. Many starch derivatives are cationic and/or amphoteric. Generally, any starch can be used from which the acrylamide monomers can be polymerized. A preferred starch is hydroxyethylated corn starch.

The acrylamide monomer may be acrylamide, acrylamide derivatives, or a combination thereof. Non-limiting examples of suitable acrylamide derivatives include N-t-butyl acrylamide, N-methylol acrylamide, and methacrylamide. Acrylic acid also can be used in small quantities.

In order to prepare the grafted co-polymer of starch and acrylamide, acrylamide monomer is mixed with the starch. The amount of acrylamide monomer relative to the starch can vary over a wide range, for example from about 1:9 to about 9:1 by weight. As a result, the grafted starch co-polymer most often will contain from about 10 to about 90 wt % of the starch component, more usually from 25 to about 75 wt %; and most often will contain from about 10 to about 90% of the acrylamide monomer, more usually from about 25 to about 75 wt %, and even more usually from about 40 to about 60 wt %, based on the total weight of starch and acrylamide.

The acrylamide monomer is polymerized in the presence of a cationic monomer to provide the grafted starch co-polymer with cationic charges. Examples of suitable cationic monomers include diallylamine and its respective salts, N-alkyl diallylamine and its respective salts, diallyldialkyl ammonium quaternary salts, N,N-dialkylaminoalkyl acrylate and methacrylate and their respective salts, N,N-dialkylaminoalkyl acrylamide and methacrylamide and their respective salts, and Ar-vinylbenzyldialkylamine and its respective salts. A preferred cationic monomer is diallyldimethyl ammonium chloride (DADMAC).

The amount of cationic monomer used in making the co-polymer can vary over a wide range and should be at least a minimum amount which improves performance of the emulsification agent. The amount of cationic monomer should not be more than a maximum amount above which emulsion particle size is adversely affected. Within these broad parameters, however, the particular amount of cationic monomer used is not critical to emulsion stability. Determining an appropriate amount for any specific combination of starch, ASA, and cationic monomer is well within the skill of the art using routine experimentation. In a preferred embodiment, the amount of cationic monomer ranges from about 0.033 to about 0.15 mole per mole of the acrylamide monomer.

The starch grafted cationic co-polymer can be prepared by reacting the acrylamide monomer, cationic monomer, and starch in an aqueous medium, in the presence of the water-soluble free-radical catalyst. The grafted starch co-polymers typically are prepared by heating the solution of starch, acrylamide monomer, and cationic monomer to about 75 to 95° C. until the starch is gelatinized, and then adding the free-radical catalyst. The reaction then is maintained at a suitable temperature for polymerization, usually at about 90° C. Alternatively, the starch may be pregelatinized and the reaction mixture thereafter formed. While not wanting to be bound by theory, it is believed that a free radical is generated on the starch backbone, at which site the acrylamide monomer and the cationic monomber are grafted and polymerize. At the time of the grafting and polymerization, the starch essentially is in a gelatinized (solubilized) form. Typically, the reaction is carried out until all the monomer is consumed. The grafting and polymerization should be conducted in substantially neutral to acidic conditions. Preferably, the reaction is run at a pH of about 4 to about 5.

Other components also may be blended with the emulsification agent prior to or at the time of forming the ASA size emulsion, such as surfactants, dispersants, and the like. Such other components, of course, should be compatible with the cationic co-polymer. Whether a particular component is compatible with the cationic co-polymer will be apparent to those skilled in the art with the aid of no more than routine experimentation.

An ASA size emulsion then can be prepared, for example, by combining the starch grafted co-polymer with de-ionized water, followed by blending with the ASA (optionally containing a surfactant). The amount of water used should be at least a minimum quantity which permits emulsification of the ASA particles (droplets). The ASA size emulsion typically is prepared using a high-shear mixer. However, there is no criticality in the ASA particle (droplet) size; even an emulsion having an ASA particle size of 3–5 microns is stable. No particular upper limit on the amount of water is contemplated; the emulsion can be made as dilute as desired or needed for particular processing applications. Preferably, the emulsion is prepared using from about 25 to about 40 wt % ASA, based on total weight, and thereafter is diluted, as necessary, to meet particular metering requirements.

The amount of starch grafted co-polymer used in preparing the emulsion can vary over a wide range. The amount should be at least a minimum quantity which helps promote the emulsification of the ASA size. The weight ratio of the grafted co-polymer to ASA typically will range from about 0.01:1 to about 1:1, more typically from about 0.02:1 to about 0.2: 1, and even more typically from about 0.03:1 to about 0.15:1, by weight on a dry basis. For purposes of emulsifying the ASA size, a preferred weight ratio of co-polymer to ASA is 0.04:1 to 0.1:1. For many applications, it may be advantageous to use higher amounts of the co-polymer to impart various properties to intermediate or end products. There is no particular maximum amount of co-polymer contemplated; the practical limiting factor is cost.

EXAMPLES

The following Examples are provided for illustrative purposes only and are not intended to limit the scope of the invention.

Example 1

This Example illustrates the preparation of a starch grafted cationic acrylamide co-polymer solution having 15 wt % solids, at a 1:1 weight ratio (starch to acrylamide). The starch used was Penford Gum 280, a hydroxyethylated cornstarch commercially available from Penford Products.

A starch grafted cationic acrylamide copolymer was prepared by charging into a reaction vessel at room temperature with agitation: 612 g of deionized water, 120 g of acrylamide (supplied as a 50 wt % aqueous solution), 15 g of diallyldimethyl ammonium chloride (supplied as a 63 wt % aqueous solution, available from Ciba Specialties), and 70 g of hydroxyethylated corn starch. The pH of the reaction mass was adjusted to 4.0 using dilute sulfuric acid. The reaction mass was de-aerated by sparging with nitrogen gas for 1 hour.

A free radical catalyst was prepared by combining 1.4 g of potassium persulfate and 52 g of water to form a ~3 wt % aqueous solution of potassium persulfate. The catalyst solution was divided into four equal portions of about 13.4 g each. A second catalyst solution to be used as the final catalyst charge was prepared by combining 1.4 g of potassium persulfate and 52 g of water.

Following de-aeration, the reaction mass was heated to 75° C. One portion (13.4 g) of the potassium persulfate solution was added and the reaction mass exothermed to about 90° C.

Two of the remaining three portions (13.4 g each) of the potassium persulfate solution were added on 30 minute intervals, with the temperature of the reaction mass held at 90° C. for each initiated charge. After the third portion was added, the reaction mass was held for one hour, after which the final catalyst charge was added. Following addition of the final catalyst charge, the reaction mass was held for one hour at 90° C., and thereafter was post-treated with 0.0013 wt % of glyoxal for cross-linking.

Example 2

This Example illustrates the preparation of ASA size emulsions using the starch grafted cationic acrylamide co-polymer of Example 1 as an emulsification agent at a weight ratio of 0.06:1 (emulsifier to ASA on a dry basis). NOVASIZE ASA®(available from Georgia-Pacific Paper Chemicals) containing 0.9 wt % sodium dioctyl sulfosuccinate surfactant was used.

Twenty-four grams (24 g) of the starch grafted cationic acrylamide co-polymer solution of Example 1 (15% solids by weight) and 316 g of deionized water were added to a blender (16 speed Osterizer) and stirred at medium speed. Sixty grams (60 g) of ASA containing 0.9 wt % sodium dioctyl sulfosuccinate surfactant were added and the mixture was blended at high speed for four minutes. The resulting 15 wt % ASA emulsion was fluid and milk-white. A portion was diluted to 2 wt % ASA. Both the 15 wt % ASA size and the 2 wt % ASA size emulsions showed no evidence of breakage, separation, or ASA particle clustering after 7 days storage at room temperature. Samples also were diluted to 1.5 wt % ASA and particle size was determined immediately and after 24 hours.

Using a similar procedure, ASA size emulsions also were prepared at a weight ratio of 0.2:1 (emulsifier to ASA on a dry basis).

Example 3

This Example illustrates the preparation of handsheets using the ASA size emulsions of Example 2.

Handsheets were made with either old newsprint, or old corrugated container (OCC). A Turbulent Pulse Sheet Former (TPSF, available from Paper Research Materials) was used to prepare the sheets. Stock (slushed in tap water) and water were treated with 200 ppm sulfate ion and 150 ppm alkalinity, respectively. Ground calcium carbonate (GCC) at 1.5 wt % on fiber, was added to the stock to provide a stable pH of about 7.4. Using white water recirculation, two sheets were made and discarded and two more were then made for testing.

The ASA size emulsions were diluted with deionized water to 0.04 wt % ASA for addition to handsheet portions of the papermaking stock, with stirring maintained for 60 seconds before making the sheet. Sheets were conditioned overnight and tested using the Hercules Sizing Test (HST) (TAPPI) with 1% formic acid ink. All emulsions gave typical sizing results.

Comparative Example 1

This Example illustrates preparing ASA size emulsions using physical blends of starch and cationic acrylamide co-polymer. Penford Gum 280 was used as the starch. The starch was solubilized by two different procedures. In the first procedure, "PG1," a 15 wt % slurry of Penford Gum 280 was reacted for 3 hours at 75–90° C. with potassium persulfate (c.f. Example 1). The resultant solution is heterogeneous with the top a yellow transparent liquid and the bottom a white opaque liquid or powder. In the second procedure, "PG2," Penford Gum 280 was solubilized using a standard starch cook procedure where a 15 wt % solids slurry was heated at 90° C. for 30 minutes.

Emulsions were prepared at 15 wt % ASA solids at 0.2:1 and 0.06:1 weight ratios of emulsifier to ASA (on a dry weight basis). The emulsions then were diluted to 5 wt % and 0.5 wt % ASA solids. These diluted samples then were divided in two. One half of the samples were held at room temperature for 72 hours and the other one-half were held for one hour at 150° F. (65.6° C.). Particle size was measured immediately after the emulsions were prepared and again after one hour at 150° F. (65.6° C.).

For comparison, emulsions also were prepared using Nalco 7541, a commercially available cationic acrylamide co-polymer, as an emulsifier. The emulsions were prepared at 15 wt % ASA solids at 0.2:1 and 0.06:1 weight ratios of emulsifier to ASA (on a dry weight basis).

Table 1 summarizes emulsifier composition for the physical blends, for Nalco 7541, and for the grafted co-polymers (Example 1), and also particle size of the emulsions. Table 2 summarizes the appearance of the emulsions at 15 wt %, 5 wt %, and 0.5 wt % ASA solids, respectively, each after one hour at 150° F. (65.6° C.), after 72 hours following the 150° F. (65.6° C.) treatment, and after 72 hours at room temperature.

TABLE 1

Emulsion Stability

| Emulsion No. | Emulsifier:ASA ratio (by wt on dry basis) | Polymer | Starch Component | Particle Size Immediate (microns) mean/median | Particle Size after 1 hour at 150° F. (65.6° C.) (microns) mean/median | Change in Particle Size (microns) mean/median |
|---|---|---|---|---|---|---|
| 1 | 0.2:1 | Blend | PG1 | 2.176/1.661 | 2.390/1.829 | 0.214/0.168 |
| 2 | 0.2:1 | Blend | PG2 | 1.950/1.577 | 2.322/1.845 | 0.372/0.268 |
| 3 | 0.2:1 | Grafted | — | 1.061/0.959 | 1.473/1.206 | 0.412/0.247 |
| 4 | 0.2:1 | Nalco | — | 1.231/1.096 | 1.511/1.367 | 0.280/0.271 |
| 5 | 0.06:1 | Blend | PG1 | 4.490/2.259 | 5.919/4.669 | 1.429/2.410 |
| 6 | 0.06:1 | Grafted | — | 1.463/1.214 | 1.442/1.276 | −0.021/0.062 |
| 7 | 0.06:1 | Nalco | — | 1.926/1.631 | 4.769/2.308 | 2.843/0.677 |

TABLE 2

Emulsion Appearance after 150° F. (65.6° C.) Treatment and 72 Hours Equilibration

| Emulsion No. | ASA (wt %) | 1 hour @ 150° F. (65.6° C.) | 72 hours after 150° F. (65.6°C.) Treatment | 72 Hours at Room Temperature |
|---|---|---|---|---|
| 1 | 15 | NE | NE | 4 layers; yellow oil, white hydrolyzate, yellow water, white ppt. |
| 1 | 5 | No change | Oil on top | Oil on top, ppt on bottom |
| 1 | 0.5 | No change | Oil on top | Oil on top, hydrolyzed and settled |
| 2 | 15 | NE | NE | White ppt throughout, water on top |
| 2 | 5 | Slight oil ring on top | Completely hydrolyzed | Slight oil on top, thick ppt on bottom |
| 2 | 0.5 | Slight white ppt ring on top | White ppt on bottom | Oil on top, ppt on bottom |
| 3 | 15 | NE | NE | White cream throughout |
| 3 | 5 | Slight white ppt ring on top | White ppt throughout | Slight ppt throughout |
| 3 | 0.5 | Slight white ppt on top | White ppt on bottom | Slight ppt |
| 4 | 15 | NE | NE | Slight oil on top; milky throughout |
| 4 | 5 | No change | White ring on top | Slight oil on top |
| 4 | 0.5 | No change | Slight white ppt on bottom | White ppt on bottom |
| 5 | 15 | NE | NE | 3 layers; thick yellow oil, thin white ppt, gray water |
| 5 | 5 | Oil on top | Split; oil on top | Lots of oil on top |
| 5 | 0.5 | No change | Hydrolyzed; white ppt on top | Complete hydrolysis; ppt on top |
| 6 | 15 | NE | NE | 2 layers; white cream top (90%), gray water (10%) |
| 6 | 5 | No change | Slight white ppt | White ppt throughout |
| 6 | 0.5 | Slight white ppt | Slight white ppt throughout | Slight ppt |
| 7 | 15 | NE | NE | Complete split into oil and water |
| 7 | 5 | Medium white ring | Split; oil on top | Oil on top |
| 7 | 0.5 | Slight oil ring on top | Some oil on top; slight white ppt throughout | Oil on top; slight ppt |

NE = not evaluated
ppt = precipitate

With the exception of the starch grafted acrylamide (emulsion nos. 3 and 6), emulsions made at a 0.2:1 weight ratio (emulsifier to ASA) formed more stable emulsions than did emulsions made at the lower (0.06:1) weight ratio. Emulsion no. 6 (made using the grafted co-polymer of the present invention) had the lowest original particle size, and maintained particle size through the accelerated aging treatment. Emulsion no. 6 was found to be the best emulsion after accelerated aging, while emulsion no. 3 was found to be the best when kept at room temperature. Emulsions nos. 2 and 5 (which used physical blends of a cationic polyacrylamide and starch) had the worst appearance under ambient conditions as well as under accelerated aging.

Comparative Example 2

Emulsifiers were prepared with physical blends of cationic acrylamide co-polymer (Nalco 7541) and starch. The starches used were Stalok 600 ("S600"), a pregelatinized cationic potato starch, and Stalok 400 ("S400"), a cationic potato starch. Both starches are commercially available from A. E. Staley. The Stalok 600 starch was mixed for 4 hours at room temperature.

The Stalok 400 starch was cooked for 30 minutes at 90° C.

ASA size emulsions were prepared at a ratio of 0.2:1 (emulsifier to ASA by weight on a dry basis) at 15 wt % solids diluted to 1 wt %, and then diluted to 0.05 wt %. Particle size was measured of the 1 wt % emulsion immediately and then 24 hour later. Table 3 summarizes emulsion stability for the emulsions so-prepared. Table 4 summarizes emulsion particle size initially and after 24 hours at room temperature.

TABLE 3

Emulsion Stability for Blends (Change in Particle Size After 24 Hours)

| Polymer | Starch Component | Change in Median Particle Size (microns) | Change in Mean Particle Size (microns) |
|---|---|---|---|
| Nalco 7541 | S600 | 0.17 | 0.24 |
| Nalco 7541 | S400 | 0.65 | 1.66 |

TABLE 4

Emulsion Particle Size for Blends Initially and After 24 Hours

| Polymer | Starch | Particle Size, Immediate (microns) | Particle Size After 24 hrs (microns) | Appearance 24 hr | Appearance 48 hr |
|---|---|---|---|---|---|
| Nalco 7541 | S600 | 1.148 median 1.295 mean | 1.314 median 1.532 mean | No change | White ppt forming |
| Nalco 7541 | S400 | 1.065 median 1.162 mean | 1.713 median 2.817 mean | No change | White ppt forming |

The principles, preferred embodiments and modes of operation of the present invention have been described in the foregoing specification. The invention which is intended to be protected herein, however, is not to be construed as limited to the particular forms disclosed, since they are to be regarded as illustrative rather than restrictive. Variations and changes may be made by those skilled in the art without departing from the spirit of the invention.

What is claimed is:

1. A process of emulsifying alkenyl anhydride size comprising blending an alkenyl succinic anhydride and a starch grafted calionic acrylmide co-polymer under conditions sufficient to form an emulsion, wherein said grafted cationic co-polymer comprises a reaction product of starch, acrylamide, and a diallyldialkyl ammonium halide.

2. The process of claim 1 wherein said alkeinyl succinic anhydride is mixed with a surfactant prior to forming said emulsion.

3. The process of claim 2 wherein said surfactant is sodium dioctyl sulfosuccinate.

4. The process of claim 1 wherein said starch grafted cationic acrylamide co-polymer comprises from about 10 to about 90 wt % of a starch monomer and from about 10 to about 90 wt % of an acrylamide monomer, based on the total weight of starch and acrylamide.

5. The process of claim 4 wherein said starch grafted cationic acrylamide co-polyrner comprises from about 25 to about 75 wt % of said starch monomer and from about 25 to about 75 wt % of said acrylamide monomer, based on the total weight of starch and acrylamide.

6. The process of claim 1, wherein said alkenyl succinic anhydride and said starch grafted cationic acrylainide co-polymer are blended at a weight ratio of starich grafted cationic ac,rylimide to alkenyl succinic anhydride of from about 0.01:1 to about 1:1.

7. The process of claim 6 wherein said weight ratio is from about 0.02:1 to about 0.2:1.

8. An emulsified alkenyl succinic anhydride size produced by the process of claim 1.

9. The process of claim 1 wherein the diallyldialkyl ammonium halide is diallyldimethyl ammonium chloride.

* * * * *